United States Patent Office 3,536,454
Patented Oct. 27, 1970

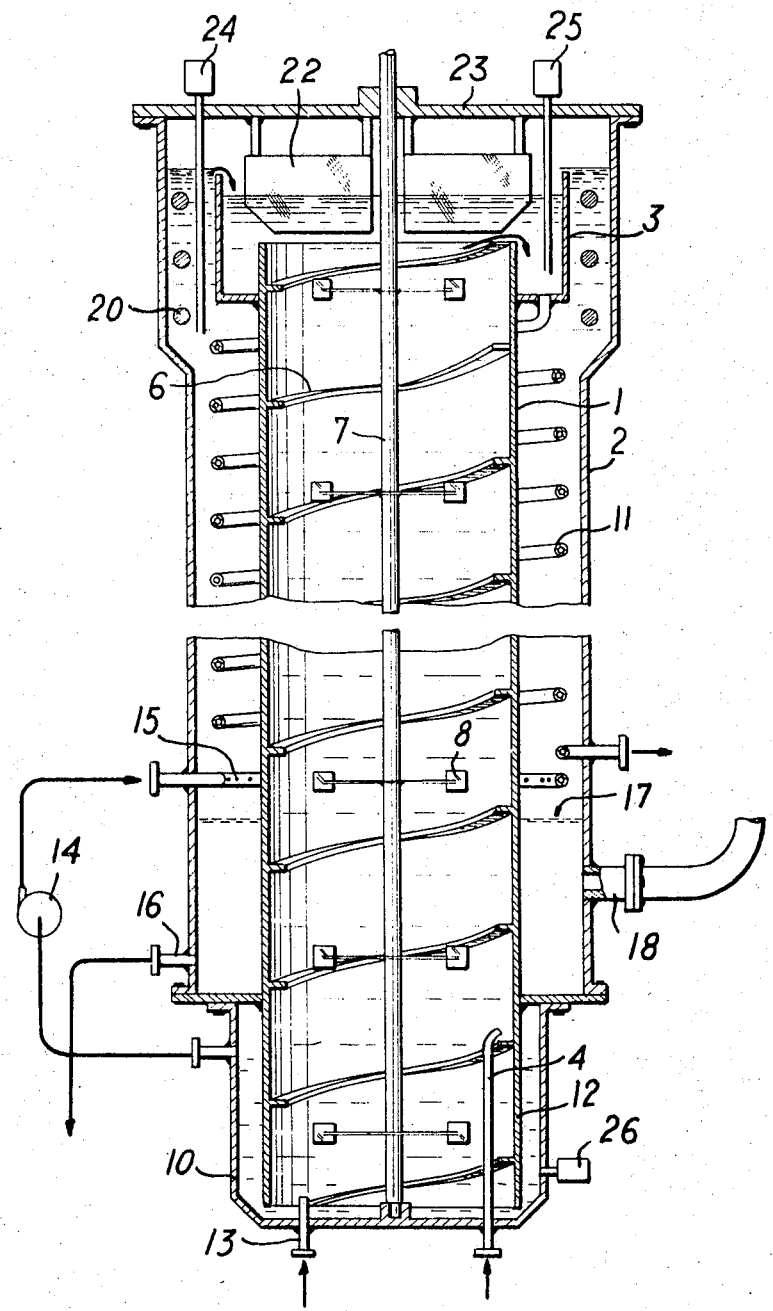

3,536,454
APPARATUS FOR EXTRACTION OF WATER FROM SALINE SOLUTIONS
Roland Vuillemey, Wissous, France, assignor to Commissariat a l'Energie Atomique, Paris, France
Filed Mar. 11, 1968, Ser. No. 712,255
Claims priority, application France, Apr. 5, 1967, 101,653
Int. Cl. B01d 11/04
U.S. Cl. 23—270.5                                    5 Claims

ABSTRACT OF THE DISCLOSURE

A process for the purification of water from a saline solution comprising a first step of extraction at progressively decreasing temperatures by circulating said solution countercurrent to a solvent for the water and a second step of separation at progressively increasing temperatures by circulating the loaded solvent countercurrent to pure water, said steps being carried out on each side of a heat-transfer wall and the solvent being circulated respectively in both directions on each side of the wall.

---

This invention relates to a process for the purification of water from a saline solution as well as an apparatus for the practical application of said process.

The invention is primarily applicable to the separation of fresh water from sea water, and to processes in which the water is extracted by means of a solvent, then separated from the solvent at a higher temperature than that of the extraction process.

There are usually employed for this purpose organic solvents having an amine base in which the salts contained in sea water are insoluble at ordinary temperature. The fresh water is then separated from the solvent by heating to approximately 50° C.

In the practical application of known processes, the two steps of extraction and separation of the fresh water after reheating are carried out separately in conventional countercurrent exchange plants. The solvent which is separated is recycled to the extraction.

However, none of these processes has proved suitable for industrial use up to the present time on account of the prohibitive cost of production of fresh water. The essential disadvantage of such processes lies in the fact that the quantities of water which have to be absorbed by the solvent call for a considerable amount of power.

The present invention has the primary object of reducing the power which is necessary and consequently of permitting the application of solvent extraction processes to the treatment of sea water under profitable economic conditions from an industrial viewpoint.

To this end, the invention consists in recovering the dissolution energy which is released at the extraction stage in order to take part in the heating which is necessary for the separation stage.

The invention is further concerned with a process for the purification of water from a saline solution, said process being primarily intended for the production of fresh water from sea water and essentially characterized in that it comprises a first stage of extraction performed at progressively decreasing temperatures by circulating said solution countercurrent to a solvent for the water, and a second stage of separation performed at progressively increasing temperatures by circulating the loaded solvent countercurrent to pure water, said stages being carried out on each side of a heat-transfer wall and the solvent being circulated in a closed cycle and respectively in two opposite directions on each side of said wall.

The present invention is also concerned with an apparatus for the practical application of the process referred to above. In this apparatus, the two aforesaid stages are carried out in two coaxial columns in which the solvent is circulated in two opposite directions countercurrent respectively to the saline solution and to the fresh water.

The apparatus in accordance with the invention for the purification of water from a saline solution by solvent extraction followed by separation of the solvent at a different temperature is essentially characterized in that it comprises:

two coaxial vertical columns, namely an extraction column and a separating column;
means for circulating said solvent in a closed cycle respectively in two opposite directions within said columns;
means for circulating the saline solution within the extraction column countercurrent to the solvent;
means for circulating pure water through the separating column countercurrent to the solvent, said means comprising in a first of said columns means for circular agitation and a helical fin for producing an upward progression of the phase which has the higher density and which is projected onto the fin under the action of centrifugal force.

In the second of said columns, the progression of the two phases takes place in the natural direction, and the lighter phase flows upwards within the downflowing heavier phase.

In the usual case in which the solvent employed is of lower density than pure water and the saline solution, said first column is the extraction column, said extraction column being preferably placed inside the separating column.

Within the separating column, the solvent which is accordingly fed progressively into the bottom of the column is heated progressively as it absorbs the heat given off through the common wall as a result of the extraction process. The turbulence which is necessary for the transfer process is preferably developed by means of a packing and a pulsing system.

The separated solvent is preferably recycled to the extraction column after additional heating which terminates the separation process and compensates for heat losses of the process.

In a preferred embodiment of the apparatus according to the invention, the separating column comprises a coil for the circulation of the brine which is discharged from the extraction column countercurrent to the solvent. Said coil permits the recovery of the residual heat of the brine for the purpose of supplying heat to the water-loaded solvent.

One embodiment which is characteristic of the apparatus according to the invention will now be described by way of example without any limitation being implied. Reference will be made to the single figure of the accompanying drawings in which the columns are shown diagrammatically and in longitudinal cross-section.

The apparatus herein described is essentially constituted by two coaxial cylindrical columns 1 and 2 which are disposed vertically and each of which permits the countercurrent flow of two liquid phases. Within the central column which constitutes the extraction column 1, a solvent having a base of amines is contacted with a saline solution or more especially with sea water.

The top end of the extraction column 1 is surrounded by a settling tank 3 for receiving the fresh solvent which is fed directly from said tank into the extraction column. The saline solution is introduced through a supply pipe 4 which opens in the vicinity of the lower end of the extraction column.

The wall of column 1 is provided internally with a helical fin 6. In addition, the column is equipped with a mechanical agitation system consisting of a rotary shaft 7 carrying impellers 8. The shaft 7 is driven in rotation from a motor (which has not been shown in the drawings).

Said agitation system develops a turbulence which improves the contact of the solvent and the saline solution at all levels. Moreover, said system works in conjunction with the helical fin 6 so as to produce the circulation of the two phases in the direction opposite to the natural flow. The phase which has the higher density tends to be applied against the walls of the column by means of said system and is then subjected to the influence of the helical fin 6. The direction of rotation of the shaft 7 is chosen as a function of the direction of the fin 6 in such a manner as to cause the progression of the saline solution in the upward direction, whereas said solution has a higher density than the solvent employed.

Since the saline solution which is supplied to the extraction column is practically at ordinary temperature, the solvent progressively absorbs the water but does not absorb the salts contained therein. The solvent which is loaded with pure water is collected in a tank 10 which surrounds the bottom end of the column. At the top end, the brine which is obtained is discharged into the settling tank 3; before being removed, the brine passes into a coil 11 which is spirally wound between the columns 1 and 2.

The lower end of the extraction column forms a washing section 12 below the saline solution feed level. Washing of the loaded solvent is carried out therein by means of a reflux of fresh water which is fed in through the pipe 13.

The outer column 2 constitutes the separating column. Said column 2 defines with the column 1 an annular volume in which the loaded solvent is circulated countercurrent to the fresh water which is produced progressively as the separation proceeds.

The loaded solvent is taken from the reservoir 10 by a pump 14 and fed into the lower end of the separating column 2 by means of an annular distributor 15.

As it passes up the column, the solvent is heated in contact with the wall of the extraction column and at the same time in contact with the brine coil 11, thereby progressively separating-out the fresh water. By virtue of the fact that its density is higher than that of the solvent, the fresh water flows down to the bottom of the column which is provided with a pipe 16 for the delivery of the fresh water thus produced.

The separating column is a pulsed column with packing. The packing is retained by means of a grid 17. In addition, a pipe 18 serves to connect the base of the column to a conventional compressed-air system which makes it possible to produce periodic variations in pressure.

A heating resistor 20 is placed within the separating column near the top end of the column. Said resistor serves to subject the solvent to additional heating to a temperature of the order of 60° C. and consequently to complete the separation process.

The solvent which is freed of the fresh water is discharged into the tank 3 from which it is recycled into the extraction column. Within said tank, stationary vanes 22 attached to the cover 23 of the apparatus serve to stop the agitation of the brine which is discharged from the extraction column and thus permit the separation of the brine from the solvent by settling.

In the apparatus hereinabove described, the heat transfer which takes place at all energy levels across the wall which is common to both columns makes it possible to recover the dissolution energy which is released at the time of extraction so as to reheat the loaded solvent and thus permit the separation of fresh water. Recovery is thus carried out under the best thermodynamic conditions. Complementary recovery of the heat removed by the brine is ensured by means of the coil 11.

The apparatus is equipped with conventional control devices and, in particular, with regulators 24 and 25 which serve respectively to maintain the level of the water-solvent interface within the separating column and the level of the brine-solvent interface within the settling tank by modifying the respective rates of flow of the phases through each column. A safety alarm system 26 serves to provide a warning in the event that any water should collect at the bottom of the extraction column.

It will be clear that the invention is not limited in any sense to the particular embodiment which has been described hereinabove by way of example but is intended to include all alternative forms within its scope.

What I claim is:

1. An apparatus for the extraction of water from a saline solution by solvent extraction followed by separation of said solvent from said water at a higher temperature, said apparatus comprising an outer vertical shell and an inner vertical shell coaxial therewith defining an inner extraction column and an outer separation column, the lower end of said inner shell extending through the bottom of said outer shell, a lower shell having a closed bottom spaced about the lower end of said inner shell to provide an outlet and holding means for solvent containing extracted water, brine inlet means in the lower portion of said extraction column, coaxial weir means about the top of said inner shell, brine outlet means in the bottom of said outer shell, a lower shell having a of a spiral heat exchanger disposed about said inner shell in said separation column, brine discharge means connected to the bottom end of said heat exchanger, fresh water inlet means connected to said holding means, heating means disposed between said outer shell and said weir means to provide additional heating to said solvent, a helical fin attached to and extending along the inner surface of said inner shell, rotary agitating means for producing circular agitation in said extraction zone and producing in cooperation with said helical fin upward progression of the brine in the extraction zone, extracted water collection means in the lower portion of said separation column, and liquid delivery means connecting the holding means with the separation column at a level above said water collection means and below said spiral heat exchanger.

2. An apparatus in accordance with claim 1, wherein the spiral heat exchanger comprises a coil through which the brine is circulated.

3. An apparatus in accordance with claim 1, wherein a pulse means is connected to the lower portion of said separation zone.

4. An apparatus in accordance with claim 1 including comprising a pump for re-circulating the loaded solvent from the bottom of the extraction column into the separating column and wherein said weir means is a tank which is surrounded by the top end of the extraction column and into which the solvent is discharged from the separating column so as to be recycled into the extraction column.

5. An apparatus in accordance with claim 4, wherein said tank contains stationary vanes which assist the settling of the brine and of the solvent.

References Cited

UNITED STATES PATENTS

| | | | |
|---|---|---|---|
| 3,177,139 | 4/1965 | Kimberlin | 23—312 X |
| 3,193,361 | 7/1965 | Niedner | 23—273 X |
| 3,239,459 | 3/1966 | Patterson | 23—312 X |
| 3,292,683 | 12/1966 | Buchi | 202—175 X |
| 3,306,710 | 2/1967 | Messing | 23—273 |
| 3,308,063 | 3/1967 | Hess | 23—312 X |
| 3,314,882 | 4/1967 | Schroeder | 23—312 X |
| 3,350,298 | 10/1967 | Car | 23—312 X |
| 3,350,299 | 10/1967 | Hess | 23—312 X |
| 3,408,290 | 10/1968 | Schiebel | 210—22 |
| 3,443,095 | 5/1969 | Goossens | 23—269 X |

OTHER REFERENCES

Barton: "Hydrocarbon Extraction of Saline Waters," Ind. Eng. Process Des. Develop., vol. 9, No. 1, January 1970, pp. 18–25.

NORMAN YUDKOFF, Primary Examiner

S. J. EMERY, Assistant Examiner

U.S. Cl. X.R.

23—310; 202—175; 210—22